(12) United States Patent
McCarthy et al.

(10) Patent No.: US 8,840,779 B2
(45) Date of Patent: Sep. 23, 2014

(54) DEWAXING CATALYSTS

(75) Inventors: Stephen J. McCarthy, Center Valley, PA (US); Wenyih F. Lai, Bridgewater, NJ (US); Darryl Donald Lacy, Easton, PA (US); Robert Ellis Kay, Easton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 758 days.

(21) Appl. No.: 13/021,835

(22) Filed: Feb. 7, 2011

(65) Prior Publication Data

US 2011/0192766 A1 Aug. 11, 2011

Related U.S. Application Data

(60) Provisional application No. 61/337,694, filed on Feb. 9, 2010.

(51) Int. Cl.

| | |
|---|---|
| *C10G 11/05* | (2006.01) |
| *C10G 35/06* | (2006.01) |
| *C10G 35/085* | (2006.01) |
| *C10G 35/095* | (2006.01) |
| *B01J 29/06* | (2006.01) |
| *B01J 29/70* | (2006.01) |
| *B01J 29/74* | (2006.01) |
| *C10G 45/62* | (2006.01) |
| *B01J 35/02* | (2006.01) |
| *B01J 35/00* | (2006.01) |
| *C10G 45/64* | (2006.01) |
| *B01J 37/00* | (2006.01) |
| *B01J 35/10* | (2006.01) |
| *B01J 21/06* | (2006.01) |
| *B01J 37/04* | (2006.01) |
| *B01J 29/40* | (2006.01) |
| *B01J 29/65* | (2006.01) |

(52) U.S. Cl.
CPC .............. *B01J 35/002* (2013.01); *B01J 29/703* (2013.01); *B01J 29/7461* (2013.01); *B01J 29/40* (2013.01); *B01J 2229/42* (2013.01); *C10G 45/62* (2013.01); *B01J 35/026* (2013.01); *C10G 45/64* (2013.01); *C10G 2300/4018* (2013.01); *B01J 35/023* (2013.01); *B01J 37/0009* (2013.01); *B01J 35/1061* (2013.01); *B01J 29/7038* (2013.01); *B01J 29/70* (2013.01); *B01J 29/7046* (2013.01); *B01J 21/063* (2013.01); *B01J 29/65* (2013.01); *B01J 29/7023* (2013.01); *B01J 35/1019* (2013.01); *B01J 37/04* (2013.01)
USPC .............. 208/120.1; 208/120.35; 208/120.01; 208/134; 208/135; 208/137; 208/138; 502/60; 502/64; 502/66; 502/71; 502/73; 502/74; 502/77

(58) Field of Classification Search
USPC ........................ 502/60, 64, 66, 71, 73, 74, 77; 208/120.1, 120.35, 120.01, 134, 137, 208/138, 135
See application file for complete search history.

(56) References Cited

U.S. PATENT DOCUMENTS

| | | |
|---|---|---|
| 6,958,305 B2 | 10/2005 | Verduijn et al. |
| 7,335,295 B2 | 2/2008 | van den Berge et al. |
| 7,641,788 B2 | 1/2010 | Hansen et al. |
| 2006/0252632 A1* | 11/2006 | Cody et al. ...................... 502/64 |
| 2008/0083657 A1 | 4/2008 | Zones et al. |
| 2009/0186754 A1 | 7/2009 | Elia et al. |
| 2010/0187156 A1* | 7/2010 | Prentice et al. ................. 208/60 |

* cited by examiner

*Primary Examiner* — Elizabeth Wood
(74) *Attorney, Agent, or Firm* — Robert A. Migliorini

(57) ABSTRACT

A supported catalyst comprises a zeolite having a silica to alumina molar ratio of 500 or less, a first metal oxide binder having a crystallite size greater than 200 Å and a second metal oxide binder having a crystallite size less than 100 Å, wherein the second metal oxide binder is present in an amount less than 15 wt % of the total weight of the catalyst.

26 Claims, 3 Drawing Sheets

DEWAXING CATALYSTS

CROSS-REFERENCE TO RELATED APPLICATION

This application claims priority to U.S. Provisional Application Ser. No. 61/337,694 filed Feb. 9, 2010, herein incorporated by reference in its entirety.

FIELD

The present disclosure relates to catalysts for use in dewaxing and other hydrocarbon conversion processes.

BACKGROUND

Waxy feedstocks may be used to prepare basestocks having a high viscosity index (VI). However, in order to obtain a basestock having the low temperature properties suitable for most uses, it is usually necessary to dewax the feedstock. Dewaxing may be accomplished by means of a solvent or catalytically. Solvent dewaxing is a physical process whereby waxes are removed by contacting with a solvent, such as methyl ethyl ketone, followed by chilling to crystallize the wax and filtration to remove the wax. Catalytic dewaxing involves chemically converting the hydrocarbons leading to unfavorable low temperature properties to hydrocarbons having more favorable low temperature properties. Long chain normal paraffins and slightly branched paraffins readily solidify and thus result in generally unfavorable low temperature properties. Catalytic dewaxing is a process for converting these long chain normal paraffins and slightly branched paraffins to molecules having improved low temperature properties.

Catalytic dewaxing may be accomplished using catalysts that function primarily by cracking waxes to lower boiling products, or by catalysts that primarily isomerize waxes to more highly branched products. Catalysts that dewax by cracking decrease the yield of lubricating oils while increasing the yield of lower boiling distillates. Catalysts that isomerize do not normally result in significant boiling point conversion. Catalysts that dewax primarily by cracking are exemplified by the zeolites ZSM-5, ZSM-11, ZSM-12, beta and offretite. Catalysts that dewax primarily by isomerization are exemplified by the zeolites ZSM-22, ZSM-23, SSZ-32, ZSM-35, ZSM-48 and ZSM-50. To ensure adequate mechanical strength for use in a dewaxing reactor, such zeolite catalysts are generally combined with an inorganic oxide binder, such as alumina.

Conventional dewaxing catalysts are, however, susceptible to poisoning by sulfur and nitrogen contaminants in a feedstock. As a result, a hydrotreating step or other pre-treatment step often precedes a catalytic dewaxing step, in order to reduce the amount of sulfur and/or nitrogen in the feedstock. To mitigate the problem of catalyst poisoning and to allow effective dewaxing of feedstocks with very high levels of waxy materials, it is often desirable to be able to maximize the dewaxing activity of the catalyst. However, in seeking maximize activity, it is also important to maintain the mechanical strength of the catalyst.

In United States Published Patent Application No. 2009/0186754, one method of increasing the activity of a dewaxing catalyst has been identified, in which the activity improvement is achieved by using a zeolite with a low silica to alumina ratio in combination with a low surface area binder. The low surface area binder is believed to increase access to the active sites of the zeolite (e.g. acid sites). Especially for bulky feeds, increased access to zeolite active sites is expected to lead to an overall increase in activity.

However, tests have shown that the low surface area binder proposed in the '754 application tends to result in a catalyst with low crush strength and high particle density. Therefore, high solids extrusion mixtures are required to produce catalysts which achieve minimally acceptable crush strength which results in even higher particle density. Thus, if low surface area binders are to be employed to improve catalyst accessibility and activity, a method of improving the crush strength and reducing particle density of the catalyst is needed if the resultant catalyst is to be commercially viable.

According to the present disclosure, it has now been found that, by combining a zeolite with a low surface area binder (large crystallite size) mixed with a controlled and small amount of a high surface area binder (small crystallite size), it is possible to produce a catalyst having an attractive balance between catalytic activity and mechanical strength. Depending on the zeolite and operating conditions employed, the resultant catalyst can show improved performance as a dewaxing catalyst and in a variety of other catalytic processes.

SUMMARY

In one aspect, the disclosure resides in a supported catalyst comprising a zeolite having a silica to alumina molar ratio of 500 or less, a first metal oxide binder having a crystallite size greater than 200 Å and a second metal oxide binder having a crystallite size less than 100 Å, wherein the second metal oxide binder is present in an amount less than 15 wt % of the total weight of the catalyst.

Conveniently, the second metal oxide binder is present in an amount from 2 wt % to 10 wt % of the total weight of the catalyst.

Conveniently, the second metal oxide binder has a crystallite size less than 80 Å.

Conveniently, the first metal oxide binder is present in an amount from 10 wt % to 60 wt % of the total weight of the catalyst.

Generally, the metal oxide of each of the first and second metal oxide binders is selected from silica, alumina, titania, zirconia, and silica-alumina.

Conveniently, the zeolite has a silica to alumina molar ratio of 200 or less, such as 100 or less.

Conveniently, zeolite is selected from ZSM-5, EU-1, ZSM-35, ZSM-11, ZSM-23, ZSM-57, NU-87, ZSM-22, EU-2, EU-11, ZBM-30, ZSM-48, ZSM-50, MCM-22, MCM-49, MCM-56 and combinations thereof. In one embodiment, the zeolite comprises ZSM-48.

Conveniently, the catalyst further comprises a metal hydrogenation component, typically a Group 6 metal and/or a Group 8 to 10 metal, such as platinum, palladium or a mixture thereof.

In a further aspect, the disclosure resides in a process for dewaxing a wax-containing hydrocarbon feed, the process comprising contacting the feed under dewaxing conditions with a supported catalyst comprising a zeolite having a silica to alumina molar ratio of 500 or less, a first metal oxide binder having a crystallite size greater than 200 Å and a second metal oxide binder having a crystallite size less than 100 Å, wherein the second metal oxide binder is present in an amount less than 15 wt % of the total weight of the catalyst.

Conveniently, the dewaxing conditions include a temperature of from 200 to 500° C., a pressure of from 790 to 20786 kPa (100 to 3000 psig), a liquid hourly space velocity of from 0.1 to 10 hr$^{-1}$, and a hydrogen treat gas rate from 45 to 1780 m$^3$/m$^3$ (250 to 10000 scf/B).

DETAILED DESCRIPTION

Figure 1:
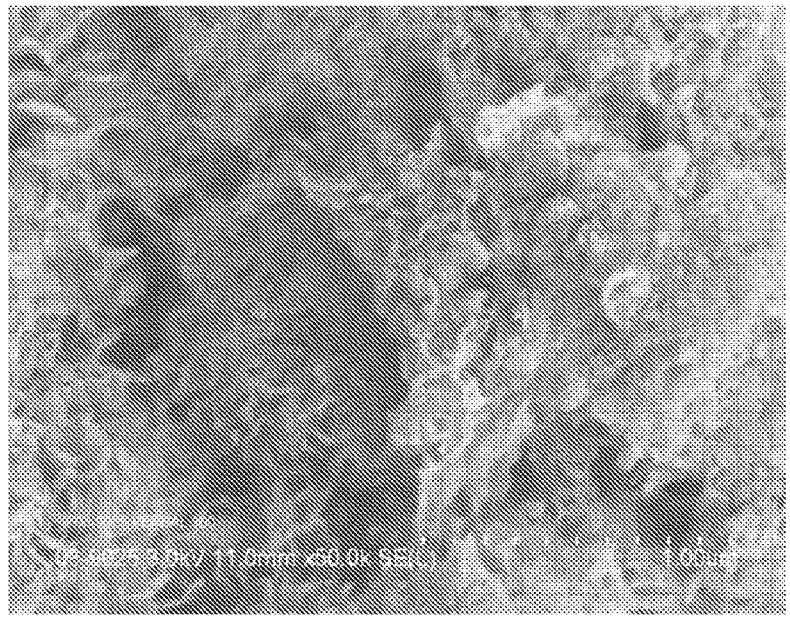
FIG. 1 is a scanning electron micrograph (SEM) of a small crystallite size boehmite alumina binder employed in the following Examples.

All numerical values within the detailed description and the claims herein are modified by "about" or "approximately" the indicated value, and take into account experimental error and variations that would be expected by a person having ordinary skill in the art.

Described herein is a supported catalyst composition comprising a zeolite which has a silica to alumina molar ratio of 500 or less and, such as 200 or less, generally 100 or less, which is combined with a mixture of at least first and second metal oxide binders having different average crystallite sizes. The first metal oxide binder has a crystallite size greater than 200 Å, typically greater than 300 Å and is generally present in an amount between 10 wt % and 60 wt % of the total weight of the catalyst. The second metal oxide binder has a crystallite size less than 100 Å, typically less than 80 Å and is present in an amount less than 15 wt %, such as from 2 wt % to 10 wt %, of the total weight of the catalyst.

The crystallite size values specified herein for the metal oxide binders are measured by scanning electron microscopy.

The metal oxide of each of the first and second metal oxide binders is generally selected from silica, alumina, titania, zirconia, and silica-alumina. Typically, the first and second metal oxide binders comprise alumina and/or titania. Examples of suitable, commercially available materials for the first metal oxide binder include TIONA DT-51 titania supplied by Millennium Chemicals, rutile titania supplied by Alfa Aesar and Catapal 200 and Pural 200 alumina supplied by Sasol North America Alumina Group. An examples of a suitable, commercially available material for the second metal oxide binder includes Versal 300 alumina supplied by UOP.

The zeolite can be combined with the first and second metal oxide binders in any convenient manner. For example, a bound catalyst can be produced by starting with powders of zeolite and the first and second binders, combining and mulling the powders with added water to form a mixture, and then extruding the mixture to produce a bound catalyst of a desired size. Alternatively, one binder can be mixed with the zeolite during formation of the zeolite powder, such as during spray drying, and a second binder then be mixed with the spray dried zeolite/binder powder prior to extrusion. Extrusion aids can also be used to modify the extrusion flow properties of the zeolite and binder mixture.

The present combination of a low silica to alumina zeolite with a binder mixture composed mostly of large crystallite size (>200 Å) binder, but also containing a small amount (<15 wt % of total catalyst) of a small crystallite size (<100 Å) binder, is found to give the present catalyst a unique balance between catalytic activity and mechanical strength. Although the resultant catalyst can be used in a wide variety of applications, such as the alkylation of benzene with ethylene and propylene to produce ethylbenzene and cumene respectively and in the transalkylation of heavy aromatics to produce BTX, the catalyst is particularly intended for use in isomerization dewaxing.

When used in isomerization dewaxing, the present catalyst also includes a metal hydrogenation component, which is generally in an amount between 0.05 and 5 wt %, more typically in an amount between 0.1 and 2.0 wt %, of the catalyst. The metal hydrogenation component is typically a Group 6 metal and/or a Group 8 to 10 metal, particularly Pt, Pd, or a mixture thereof. The metal hydrogenation component may be added to the catalyst in any convenient manner. One technique for adding the metal hydrogenation component is by incipient wetness. For example, after combining the zeolite and binder mixture, the combination can be extruded into catalyst particles. These catalyst particles can then be exposed to a solution containing a suitable metal precursor. Alternatively, the metal can be added to the catalyst by ion exchange.

The zeolite employed in the present catalyst composition will depend on the intended use of the catalyst. When the catalyst is to be used in isomerization dewaxing, suitable zeolites include those having 10-membered ring pores and particularly those having unidirectional 10-membered ring pores. Examples of suitable zeolites include ZSM-5, EU-1, ZSM-35, ZSM-11, ZSM-23, ZSM-57, NU-87, ZSM-22, EU-2, EU-11, ZBM-30, ZSM-48, ZSM-50, MCM-22, MCM-49, MCM-56 and combinations thereof, with ZSM-48 being particularly preferred.

The present catalyst, especially when containing ZSM-48 and/or ZSM-23 as the zeolite component, is particularly useful in the isomerization dewaxing of lube oil basestocks. Such feedstocks are wax-containing feeds that boil in the lubricating oil range, typically having a 10% distillation point greater than 650° F. (343° C.), measured by ASTM D 86 or ASTM D2887. Such feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

The conditions employed for dewaxing such lube oil basestocks using the present catalyst composition are not narrowly defined. However, a suitable temperature is from 200 to 500° C., such as from 250 to 400° C. A suitable pressure is from 790 to 20786 kPa (100 to 3000 psig), such as from 1480 to 17339 kPa (200 to 2500 psig). A suitable liquid hourly space velocity for the lube oil feed is from 0.1 to 10 hr$^{-1}$, such as from 0.1 to 5 hr$^{-1}$. A suitable hydrogen treat gas rate is from 45 to 1780 m$^3$/m$^3$ (250 to 10000 scf/B), such as from 89 to 890 m$^3$/m$^3$ (500 to 5000 scf/B).

The disclosure will now be more particularly described with reference to the following Examples and the accompanying drawings.

The metal oxide binders employed in the Examples have the properties summarized in Table 1.

TABLE 1

Figure 2:
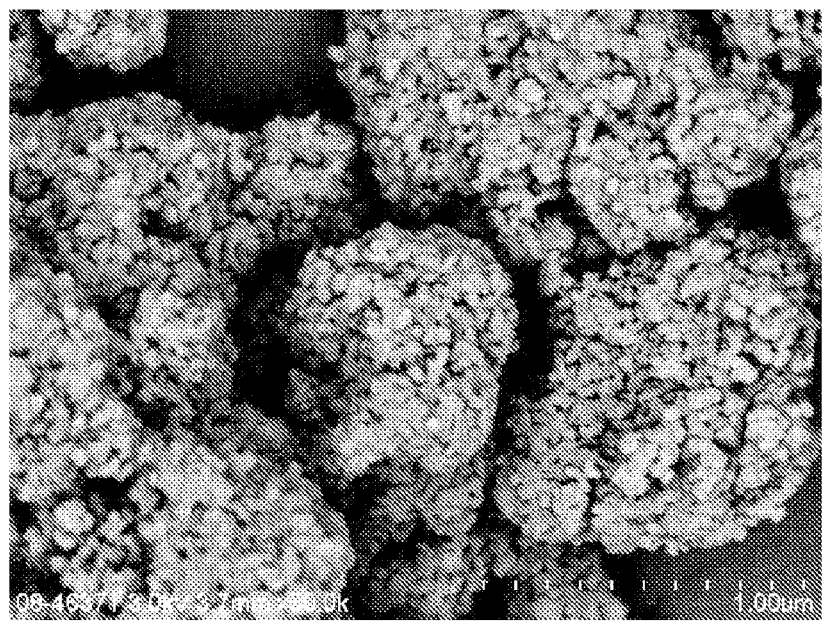
FIG. 2 is an SEM of a large crystallite size anatase titania binder employed in the following Examples.
Figure 3:
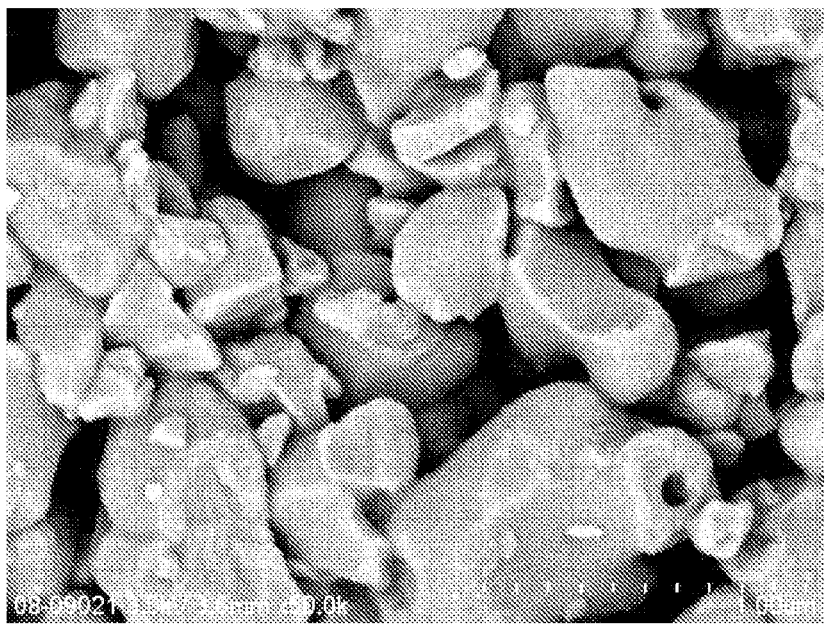
FIG. 3 is an SEM of a large crystallite size rutile titania binder employed in the following Examples.
Figure 4:
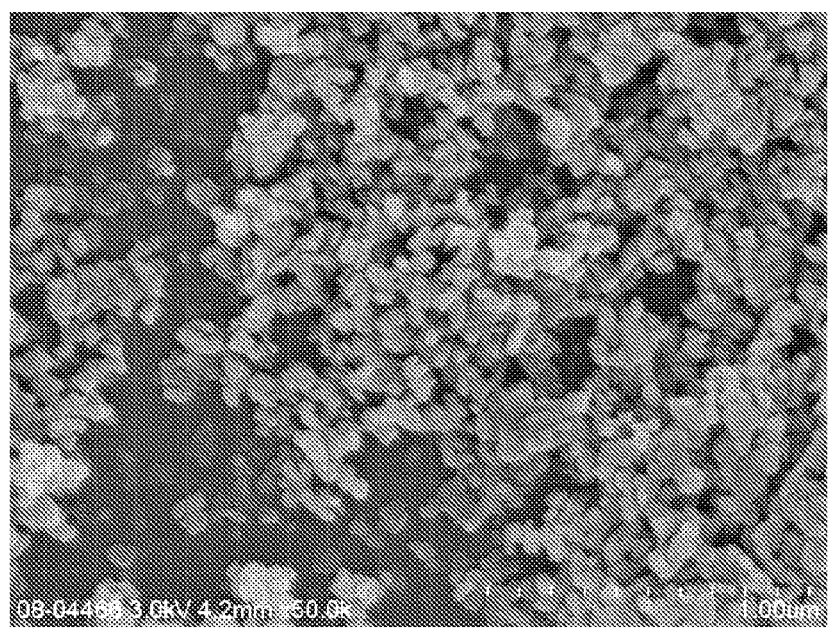
FIG. 4 is an SEM of a large crystallite size boehmite alumina binder employed in the following Examples.

| Binder type | Binder phase | Crystallite size, Å | Typical Surface area, m²/g |
|---|---|---|---|
| Versal 300 | Pseudoboehmite/alumina | 40 (FIG. 1) | 340 |
| TIONA DT-51D | Anatase/titania | 400 (FIG. 2) | 80 |
| Rutile/Alpha | Rutile/titania | >3000 (FIG. 3) | <10 |
| Catapal 200 or Pural 200 | Boehmite/alumina | 400 (FIG. 4) | 100 |

Example 1

ZSM-48 Crystals Bound with Versal 300

65 parts of ZSM-48 crystal having a silica/alumina molar ratio of 70/1 were mixed with 35 parts of Versal 300 pseudoboehmite alumina binder (basis: calcined 538° C.) in a Simpson muller. Sufficient water was added to produce an extrudable paste on a 2" (5.1 cm) diameter Bonnot extruder. The mixture of ZSM-48, pseudoboehmite alumina, and water was extruded into 1/16" diameter quadralobes and then dried in a hotpack oven at 121° C. overnight. The dried extrudate was calcined in nitrogen at 538° C. to decompose and remove the organic template used in the zeolite synthesis. The $N_2$ calcined extrudate was humifidied with saturated air and exchanged with 1 N ammonium nitrate to remove sodium (specification: <500 ppm Na). After ammonium nitrate exchange, the extrudate was washed with deionized water to remove residual nitrate ions prior to drying. The ammonium exchanged extrudate was dried at 121° C. overnight and calcined in air at 538° C. The properties of the resulting catalyst are shown in Table 2.

TABLE 2

| Example | Alpha | n-C6 adsorption | Pore size by BET | Pore volume by BET | BET, m²/g (total/micro + meso) | Crush strength, lb/in | Bulk density by Hg | Loading Density |
|---|---|---|---|---|---|---|---|---|
| 1 | 65 | 43 | 99.7 | 0.63 | 269/78 + 191 | 124 | 0.89 | 0.47 |
| 2 | 81 | 38 | 144 | 0.53 | 213/100 + 114 | 62 | 1.07 | 0.58 |
| 3 | 77 | 35 | 147 | 0.46 | 199/100 + 99 | 55 | 1.07 | 0.51 |
| 4A | 80 | 39 | 125 | 0.50 | 230/97 + 133 | 62 | ( ) | 0.54 |
| 4B | 89 | 39 | 135 | 0.58 | 218/117 + 101 | ( ) | 1.03 | 0.53 |
| 5 | 83 | 35 | 130 | 0.56 | 224/93 + 131 | 104 | 0.98 | 0.49 |
| 6 | 79 | 37 | 133 | 0.60 | 237/98 + 139 | 104 | 0.97 | ( ) |

Example 2

ZSM-48 Crystals Bound with DT-51 D Titania

The method of Example 1 was repeated but with the binder comprising 35 parts of TIONA DT-51T titania. The properties of the resulting catalyst are shown in Table 2.

Example 3

ZSM-48 Crystals Bound with 411 Mixture DT-51D and Rutile Titania

The method of Example 1 was repeated but with the binder comprising 35 parts of a mixture of TIONA DT-51T titania and Rutile titania (4/1 weight ratio). The properties of the resulting catalyst are shown in Table 2.

Example 4A and 4B

ZSM-48 Crystals Bound with Catapal 200 or Pural 200 Alumina

The method of Example 1 was repeated but with the binder comprising 35 parts of Catapal 200 alumina (Example 4A) or 35 parts of Pural 200 alumina (Example 4B). The properties of the resulting catalysts are shown in Table 2.

Example 5

ZSM-48 Crystals Bound with 3/1 Mixture of Catapal-200 and Versal 300 Alumina Using TEAOH as Extrusion Aid The method of Example 1 was repeated but with the binder comprising 35 parts of a mixture of Catapal 200 and Versal 300 pseudoboehmite alumina of (3/1 ratio) and with 2 wt % of tetraethylammonium hydroxide (TEAOH) being added to the muller as an extrusion aid. The resulting catalyst therefore contained 8.75 wt % of the small crystal size Versal 300 alumina binder. The properties of the resulting catalyst are shown in Table 2.

Example 6

ZSM-48 Crystals Bound with 3/1 Mixture of Catapal-200 and Versal 300 Alumina Using Acetic Acid as Extrusion Aid The method of Example 1 was repeated but with the binder comprising 35 parts of a mixture of Catapal 200 and Versal 300 pseudoboehmite alumina of (3/1 ratio) and with 2 wt % of acetic acid being added to the muller as an extrusion aid. The resulting catalyst therefore contained 8.75 wt % of the small crystal size Versal 300 alumina binder. The properties of the resulting catalyst are shown in Table 2.

Table 2 shows the difference in properties including surface area, n-hexane adsorption, crush strength, and bulk density for the catalysts of Examples 1 to 6. As you can see, the catalysts of Examples 2, 3, 4, 5, and 6 bound with a large crystal size binder exhibit higher microporous surface area (associated with zeolite sites) and larger pore size then the catalyst of Example 1 bound with small crystal size Versal 300. This results in higher accessibility of the zeolite acid sites and hence higher Alpha values of the catalysts of Examples 2 to 6.

Table 2 also shows that the catalysts of inventive Examples 5 and 6, prepared with a mixture of a large crystal size binder and 8.8 wt % of Versal 300, had significantly higher crush strength than the catalysts of Examples 2, 3, and 4, prepared with a large crystal size binder alone, (100 lb/in versus 60 lb/in), while maintaining the high microporous surface area and large average pore size of the catalysts of Examples 2 to 4.

It will also be seen from Table 2 that the particle density of the catalysts of Examples 5 and 6 was 10% less than the catalysts produced with the large crystal size binders alone, such as the catalyst of Example 3.

Example 7

Lube Dewaxing Evaluation

The catalysts of Examples 1, 2 and 5 were evaluated for dewaxing a 500 Neutral lube hydrocracker bottoms at 1 LHSV, 1600 psig (11,130 kPa) and 2,500 SCFB (445 m$^3$/m$^3$) hydrogen circulation rate.

Figure 5:
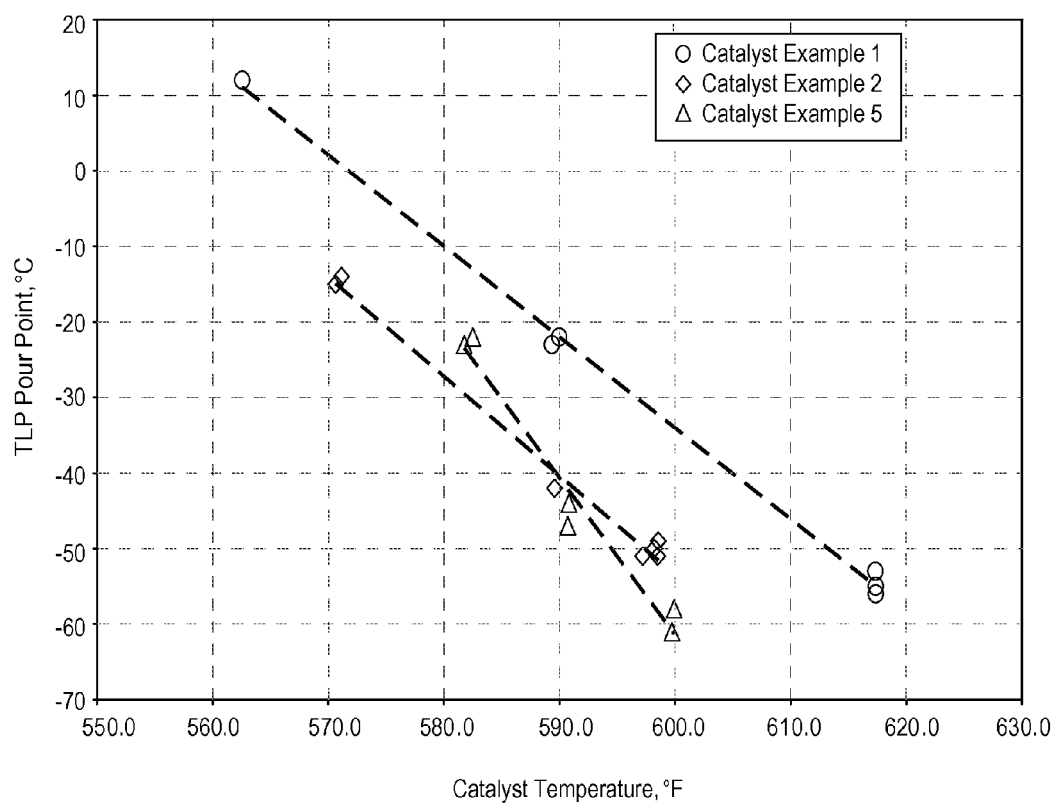
FIG. 5 shows a plot of reactor temperature versus the pour point of the total liquid product (TLP) from the reactor for the process of Example 7.

FIG. 5 shows a plot of reactor temperature versus the pour point of the total liquid product (TLP) from the reactor. As shown, the lower surface area binder of Example 2 provides a dewaxing catalyst with higher dewaxing activity than the high surface area binder of Example 1. However, as shown in Table 2, the catalyst of Example 2 has significantly poorer mechanical strength. The mixed binder of Example 5, formed by combining a lower surface area binder with a small amount of high surface area binder, provides essentially the same dewaxing activity benefit as the catalyst of Example 2. However, as shown in Table 2, the catalyst of Example 5 has significantly better mechanical properties.

Example 8

Distillate Dewaxing Evaluation

The catalyst of Examples 1, 2 and 5 were evaluated for dewaxing hydrocracked distillate at 1.8 LHSV, 800 psig (5,617 kPa), 360° C. and 2,000 SCFB (445 m$^3$/m$^3$) hydrogen circulation rate. The hydrocracked distillate feed contained 3000 ppm sulfur and 50 ppm nitrogen.

Table 3 shows the difference between the cloud points of the distillate product and feed. As shown, the lower surface area binder of Example 2 provides a dewaxing catalyst with higher dewaxing activity than the high surface area binder of Example 1 as shown by the further reduction in cloud point. However, as shown in Table 2, the catalyst of Example 2 has significantly poorer mechanical strength. The mixed binder of Example 5, formed by combining a lower surface area binder with a small amount of high surface area binder, provides essentially the same dewaxing activity benefit as the catalyst of Example 2. However, as shown in Table 2, the catalyst of Example 5 has significantly better mechanical properties.

TABLE 3

| Catalyst | Difference in Cloud Point, ° C. |
|---|---|
| Example 1 | −10 |
| Example 2 | −19 |
| Example 5 | −20 |

Applicants have attempted to disclose all forms and applications of the disclosed subject matter that could be reasonably foreseen. However, there may be unforeseeable, insubstantial modifications that remain as equivalents. While the present disclosure has been described in conjunction with specific, exemplary forms thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated.

What is claimed is:

1. A catalyst comprising a zeolite having a silica to alumina molar ratio of 500 or less, a first metal oxide binder having a crystallite size greater than 200 Å and a second metal oxide binder having a crystallite size less than 100 Å, wherein the second metal oxide binder is present in an amount less than 15 wt % of the total weight of the catalyst, wherein said zeolite is selected from ZSM-5, EU-1, ZSM-35, ZSM-11, ZSM-23, ZSM-57, NU-87, ZSM-22, EU-2, EU-11, ZBM-30, ZSM-48, ZSM-50, MCM-22, MCM-49, MCM-56 and combinations thereof.

2. The catalyst of claim 1, wherein the second metal oxide binder is present in an amount from 2 wt % to 10 wt % of the total weight of the catalyst.

3. The catalyst of claim 1, wherein the second metal oxide binder has a crystallite size less than 80 Å.

4. The catalyst of claim 1, wherein the first metal oxide binder is present in an amount from 10 wt % to 60 wt % of the total weight of the catalyst.

5. The catalyst of claim 1, wherein the metal oxide of each of the first and second metal oxide binders is selected from silica, alumina, titania, zirconia, and silica-alumina.

6. The catalyst of claim 1, wherein the zeolite has a silica to alumina molar ratio of 200 or less.

7. The catalyst of claim 1, wherein the zeolite has a silica to alumina molar ratio of 100 or less.

8. The catalyst of claim 1, wherein said zeolite has 10-membered ring pores.

9. The catalyst of claim 1, wherein said zeolite has unidirectional 10-membered ring pores.

10. The catalyst of claim 1, wherein said zeolite comprises ZSM-48 and/or ZSM-23.

11. The catalyst of claim 1 and further comprising a metal hydrogenation component supported on the catalyst.

12. The catalyst of claim 10, wherein the metal hydrogenation component is selected from platinum, palladium and mixtures thereof.

13. A process for dewaxing a wax-containing hydrocarbon feed, the process comprising contacting the feed under dewaxing conditions with a catalyst comprising a zeolite having a silica to alumina molar ratio of 500 or less, a first metal oxide binder having a crystallite size greater than 200 Å and a second metal oxide binder having a crystallite size less than 100 Å, wherein the second metal oxide binder is present in an amount less than 15 wt % of the total weight of the catalyst, wherein said zeolite is selected from ZSM-5, EU-1, ZSM-35, ZSM-11, ZSM-23, ZSM-57, NU-87, ZSM-22, EU-2, EU-11, ZBM-30, ZSM-48, ZSM-50, MCM-22, MCM-49, MCM-56 and combinations thereof.

14. The process of claim 13, wherein the second metal oxide binder is present in an amount from 2 wt % to 10 wt % of the total weight of the catalyst.

15. The process of claim 13, wherein the second metal oxide binder has a crystallite size less than 80 Å.

16. The process of claim 13, wherein the first metal oxide binder is present in an amount from 10 wt % to 60 wt % of the total weight of the catalyst.

17. The process of claim 13, wherein the metal oxide of each of the first and second metal oxide binders is selected from silica, alumina, titania, zirconia, and silica-alumina.

18. The process of claim 13, wherein the zeolite has a silica to alumina molar ratio of 200 or less.

19. The process of claim 13, wherein the zeolite has a silica to alumina molar ratio of 100 or less.

20. The process of claim 13, wherein the said zeolite has 10-membered ring pores.

21. The process of claim 13, wherein the said zeolite has unidirectional 10-membered ring pores.

22. The process of claim 13, wherein said zeolite comprises ZSM-48 and/or ZSM-23.

23. The process of claim 13, wherein the catalyst further comprises a metal hydrogenation component supported on the catalyst.

24. The process of claim 23, wherein the metal hydrogenation component is selected from platinum, palladium and mixtures thereof.

25. The process of claim 13, wherein the dewaxing conditions include a temperature of from 200 to 500° C., a pressure of from 790 to 20786 kPa (100 to 3000 psig), a liquid hourly space velocity of from 0.1 to 10 $hr^{-1}$, and a hydrogen treat gas rate from 45 to 1780 $m^3/m^3$ (250 to 10000 scf/B).

26. The process of claim 13, wherein the dewaxing conditions include a temperature of from 250 to 400° C., a pressure of from 1480 to 17339 kPa (200 to 2500 psig), a liquid hourly space velocity of from 0.1 to 5 $hr^{-1}$ and a hydrogen treat gas rate from 89 to 890 $m^3/m^3$ (500 to 5000 scf/B).

\* \* \* \* \*